No. 772,931. Patented October 25, 1904.

UNITED STATES PATENT OFFICE.

RICHARD GLEY, OF BERLIN, GERMANY, ASSIGNOR TO ACTIEN GESELLSCHAFT FÜR ANILIN FABRIKATION, OF BERLIN, GERMANY.

PROCESS OF MAKING LAKES FROM SULFUR DYES.

SPECIFICATION forming part of Letters Patent No. 772,931, dated October 25, 1904.

Application filed July 30, 1904. Serial No. 218,853. (No specimens.)

*To all whom it may concern:*

Be it known that I, RICHARD GLEY, of Berlin, in the Kingdom of Prussia, German Empire, have invented new and useful Improvements in Processes of Making Lakes from Sulfur Dyes; and I do hereby declare that the following is a full, clear, and exact description of the invention, which will enable others skilled in the art to which it appertains to make and use the same.

In United States Letters Patent No. 714,687 a process for the production of lakes from sulfur dyes is described. According to this process the solution of the dyestuff in alkali sulfids is precipitated by means of salts of an earth-alkali metal, the precipitate is washed, suspended in water containing an alkali, the lake is then prepared by adding to this alkaline liquid a suitable metal salt, and finally heating this mixture. I have stated that this process cannot be applied with practical success to such sulfur dyes which in the presence of alkali sulfids are readily reduced, forming either almost-colorless leuco compounds or such reduction products which possess another and very much weaker coloration than corresponds to the shades which are obtainable when cotton is dyed from these solutions. If to these solutions the salt of an earth-alkali metal is added, the precipitate obtained has only a slight and dull coloration and consists almost entirely of the metal salt of the leuco compound or of the reduction product of the respective dye. Moreover, I have observed that this precipitation is no complete one, a great part of the leuco compound remaining in solution.

Now I have discovered a new and very simple process which allows the production of bright-colored lakes from all these aforementioned sulfur dyes. This new process consists in adding to the aqueous solution of the sulfur dyes in alkali sulfid the solution of a salt of an earth metal or alkaline-earth metal and precipitating the lake by means of an oxidizing agent in the heat. The simplest oxidizing medium is a current of atmospheric air, which is blown through the solution; but I may with the like effect apply hydrogen peroxid, hypochlorid, or the like, only taking care to avoid an excess of the oxidizing substance. I may add a suitable lake base, such as aluminium hydroxid, &c., to the solution before, during, or after the oxidation process.

The following examples will show in what manner my process may practically be carried out:

First. Ten parts of immedial sky-blue are dissolved in two hundred and fifty parts of hot water and ten parts of crystallized sodium sulfid. A solution of twenty parts of sodium carbonate in about one hundred parts of water is then added, and a solution of seventy parts of crystallized barium chlorid in three hundred parts of water is poured in. A current of air is blown through the mixture until the lake is completely precipitated. The lake obtained is filtered off with the water and dried. It forms a brilliant blue powder.

Second. Ten parts of immedial sky-blue are dissolved in two hundred and fifty parts of water and ten parts of crystallized sodium sulfid. A solution of calcium chlorid containing fifteen parts of $CaCl_2$ is then added and eight hundred parts of a paste of aluminium hydroxid containing ten per cent. of aluminium hydroxid. To this mixture a solution of hydrogen peroxid is added at about 40° to 50° centigrade until the precipitation and oxidation is completed. The lake obtained is washed with water and forms in dry state a blue powder.

Third. Ten parts of immedial indon R conc. and fifteen parts of crystallized sodium sulfid are dissolved in three hundred parts of water. After addition of a solution of sixty parts of sodium carbonate in three hundred parts of water an aqueous solution containing in four hundred parts one hundred parts of $Al_2(SO_4)3$ is poured in, and the precipitation of the lake is carried out by means of a solution of hydrogen peroxid.

Fourth. Ten parts of thiogen blue B and fifteen parts of crystallized sodium sulfid are dissolved in two hundred and fifty parts of water, and a thin paste containing thirty parts of barium sulfate is added. A solution of twenty parts of crystallized zinc sulfate in two hundred parts of water is poured into the mixture, and the lake is precipitated by introducing a current of air into the hot mixture.

Fifth. Twenty parts of sulfur black T extra are dissolved in five hundred parts of water by means of fifteen parts of sodium sulfid. A solution of twenty-five parts of barium chlorid in one hundred and fifty parts of water is then added, and a current of air is blown through the solution at about 60° to 70° until the precipitation is complete and the black color of the precipitate does not increase in its intensity. The lake obtained is filtered off, washed, and dried. It forms a deep black powder.

It is obvious to those skilled in the art that I may vary the above-given examples in many respects without departing from the scope of my invention. For instance, I may use strontium or magnesium salts instead of barium or calcium salts. It is also apparent that other suitable lake bases, as those mentioned in the aforesaid examples, may be used.

Now what I claim is—

The process herein described of preparing lakes from those sulfur dyes which are converted by alkali sulfids in almost-colorless leuco compounds or in less-colored reduction products, said process consisting in adding to the solution of the dye in alkali sulfid a metal salt and precipitating the lake by means of an oxidizing agent, substantially as described.

In witness whereof I have hereunto signed my name, this 18th day of July, 1904, in the presence of two subscribing witnesses.

RICHARD GLEY

Witnesses:
   HENRY HASPER,
   WILLIAM MAYNER.